United States Patent [19]

Choi

[11] Patent Number: 5,783,918

[45] Date of Patent: Jul. 21, 1998

[54] METHOD OF CONTROLLING AUTOMATIC DOOR OPENING/CLOSING APPARATUS FOR A WASHING MACHINE

[75] Inventor: Ssi Chol Choi, Suwon, Rep. of Korea

[73] Assignee: Samsung Electronics Co., Ltd., Suwon, Rep. of Korea

[21] Appl. No.: 746,140

[22] Filed: Nov. 6, 1996

[30] Foreign Application Priority Data

Nov. 9, 1995 [KR] Rep. of Korea ............ 95-40475

[51] Int. Cl.$^6$ .................................... G05B 5/00
[52] U.S. Cl. .............. 318/447; 318/283; D32/6; 49/32; 49/506; 68/3 R; 312/319.5
[58] Field of Search ................ 318/280–286, 318/445–447, 456, 466–470; D32/1–13; 49/13, 31, 32, 279–80, 506; 68/3 R–212, 319.5–319.8; 134/56 R, 58 DL

[56] References Cited

U.S. PATENT DOCUMENTS

| | | |
|---|---|---|
| 3,582,173 | 6/1971 | Noren et al. ............ 312/319.4 |
| 3,589,787 | 6/1971 | Messersmith ............ 312/319 |
| 4,951,693 | 8/1990 | Archambault ............ 134/57 DL |
| 4,991,312 | 2/1991 | Pambianchi ............ 34/45 |

Primary Examiner—David S. Martin
Attorney, Agent, or Firm—Burns, Doane, Swecker & Mathis, L.L.P.

[57] ABSTRACT

There is disclosed a method of controlling an automatic door opening/closing apparatus for a washing machine that includes the steps of determining whether or not there is an error in an automatic door opening or closing operation carried out in response to a command to open or close the washing machine's door; determining if the erroneous operation has been repeated more than a predetermined number of times according to consecutive incoming commands to open or close the door; and when erroneous operation has repeated more than the predetermined number of times, ignoring a subsequent command to open or close the door.

9 Claims, 4 Drawing Sheets

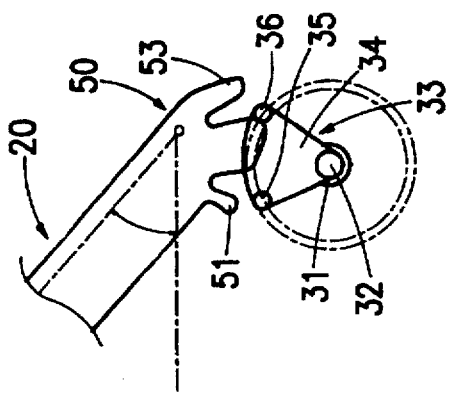
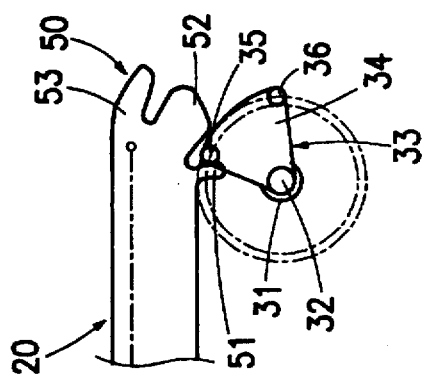
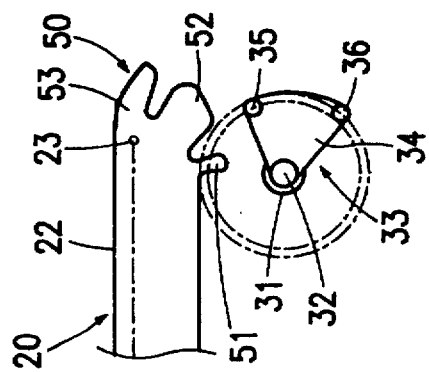
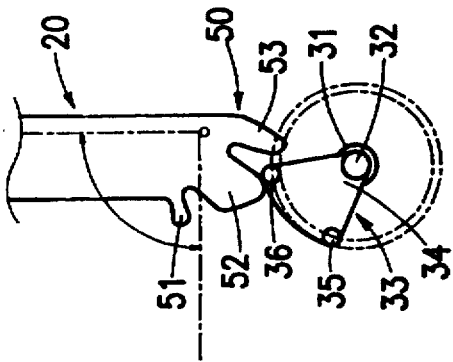
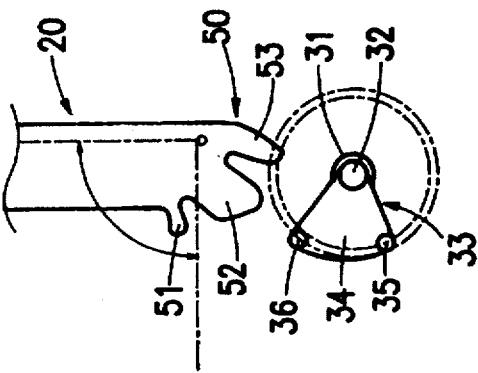

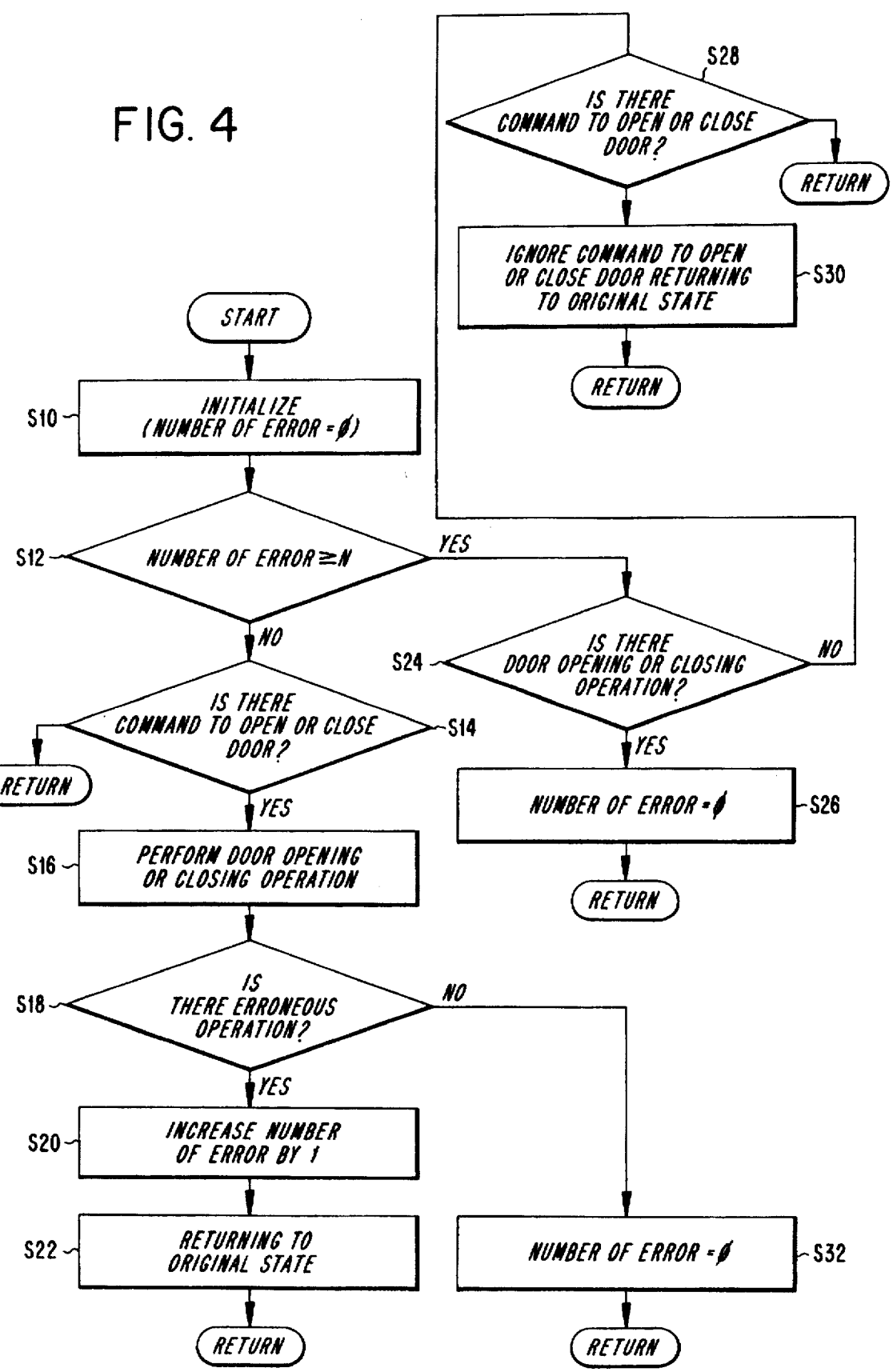

METHOD OF CONTROLLING AUTOMATIC DOOR OPENING/CLOSING APPARATUS FOR A WASHING MACHINE

FIELD OF THE INVENTION

The present invention relates generally to a washing machine with an automatic door opening/closing apparatus. More particularly, it relates to a method of controlling an automatic door opening/closing apparatus for a washing machine that stops the operation of the automatic door opening/closing apparatus in the case where there occurs an abnormal condition in automatic door opening or closing operations for the purpose of reducing the possibility of damage to the washing machine due to the forced action of the opening/closing apparatus.

BACKGROUND OF THE INVENTION

A typical upright washing machine has a door located on top of a main body of the washing machine that opens and closes an opening to the laundry tub. Users open and close the door of the washing machine on various occasions, such as when they load or remove a bundle of clothes into or out of the laundry tub; when they want to add detergent; additional laundry for washing; and/or a rinse after washing; and when they rearrange laundry in the laundry tub in order to counteract an out-of-balance condition created by the laundry.

In recent years household electric appliances of large capacity are becoming extremely popular among customers. In line with this trend, washing machines are also being designed to be of larger capacity, and doors used for these washing machines are becoming larger and heavier, also. Accordingly, it may be difficult for some users to open the door of the washing machine by hand.

In order to overcome this problem, proposed herein is an apparatus for automatically opening and closing the door of a washing machine by simple key input. The apparatus includes an open/close switch for sending a command to open or close the door, an open sensor used for sensing if the door is open, and a closed sensor used for sensing if the door is closed.

The apparatus also includes an electric door motor, which is used for opening and closing the door, and a microprocessor that determines the state of the door based on information supplied by each sensor following the issuance of a command from the washing machine's control panel to open or close the door, and then controls the operation of the electric motor according to the determination. Each of the open and sensors used for monitoring the opening and closing of the door is realized through a reed switch.

In the above arrangement, the door motor closes the door if the microprocessor receives a door open/close command followed by the open sensor reporting the door being open and the closed sensor reporting that the door is not closed. Alternatively, following the reception of a door open/close command by the microprocessor, if the closed sensor senses door being closed and the open sensor does not sense the door being open, the door motor opens the door.

In using a washing machine with the automatic door opening/closing apparatus to use, one may encounter occasions which make it difficult for the apparatus to perform a normal opening/closing task. For instance, when heavy things are placed on the door of the washing machine or garments are placed over the entrance to the laundry tub, the automatic door opening/closing apparatus cannot operate normally.

When such situations are encountered by the automatic door opening/closing apparatus, if the microprocessor senses a command to open or close the door, it should ignore the command in order to reduce the possibility of damage to the washing machine. Therefore, there is a need for prevention of damage to the door motor and other components relevant to the automatic door opening/closing operations.

SUMMARY OF THE INVENTION

The present invention is a method of controlling an automatic door opening/closing apparatus for a washing machine that can satisfy the aforementioned needs.

It is an objective of the present invention to provide a method of controlling an automatic door opening/closing apparatus for a washing machine that stops a forced action of the door motor if there is an obstacle preventing normal door opening and/or closing action. Such prevention of forced action reduces the possibility of damage to the components of the washing machine related to door opening and closing operation.

The present invention includes the steps of determining whether or not there is an error in the door opening or closing operation carried out in response to a command to open or close the washing machine's door; determining if the erroneous operation is repeated more than a predetermined number of times according to consecutive incoming commands to open or close the door; and when the erroneous operation is repeated more than the predetermined number of times, ignoring a follow-up command to open or close the door. The inventive method further includes the step of returning the door of the washing machine to its original state after the error occurs and resetting the number of errors registered in the case where the door of the washing machine is opened or closed manually when the errors in operation occur.

Additionally, the presence of an error in opening or closing operation can be determined based on whether or not an inversion occurs in the open/closed state of the door during a prescribed period of time after the automatic door opening or closing action is first detected.

BRIEF DESCRIPTION OF THE ATTACHED DRAWINGS

Aspects of the present invention will become more apparent from the following detailed description when read in conjunction with the drawings wherein:

FIG. 1 is a sectional view of a washing machine with an automatic door opening/closing apparatus in accordance with the present invention;

FIGS. 2A, 2B, 2C, 2D, and 2E respectively are enlarged views depicting sequentially the automatic door opening/closing action of the washing machine in accordance with the present invention;

FIG. 3 is a block diagram of an automatic door opening/closing apparatus in accordance with the present invention; and FIG. 4 is a flow chart describing a method of controlling the automatic door opening/closing apparatus in accordance with the present invention.

DETAILED DESCRIPTION OF PREFERRED EMBODIMENT

Reference will now be made in detail to the preferred embodiment of the present invention, examples of which are illustrated in the accompanying drawings.

Figure 1:
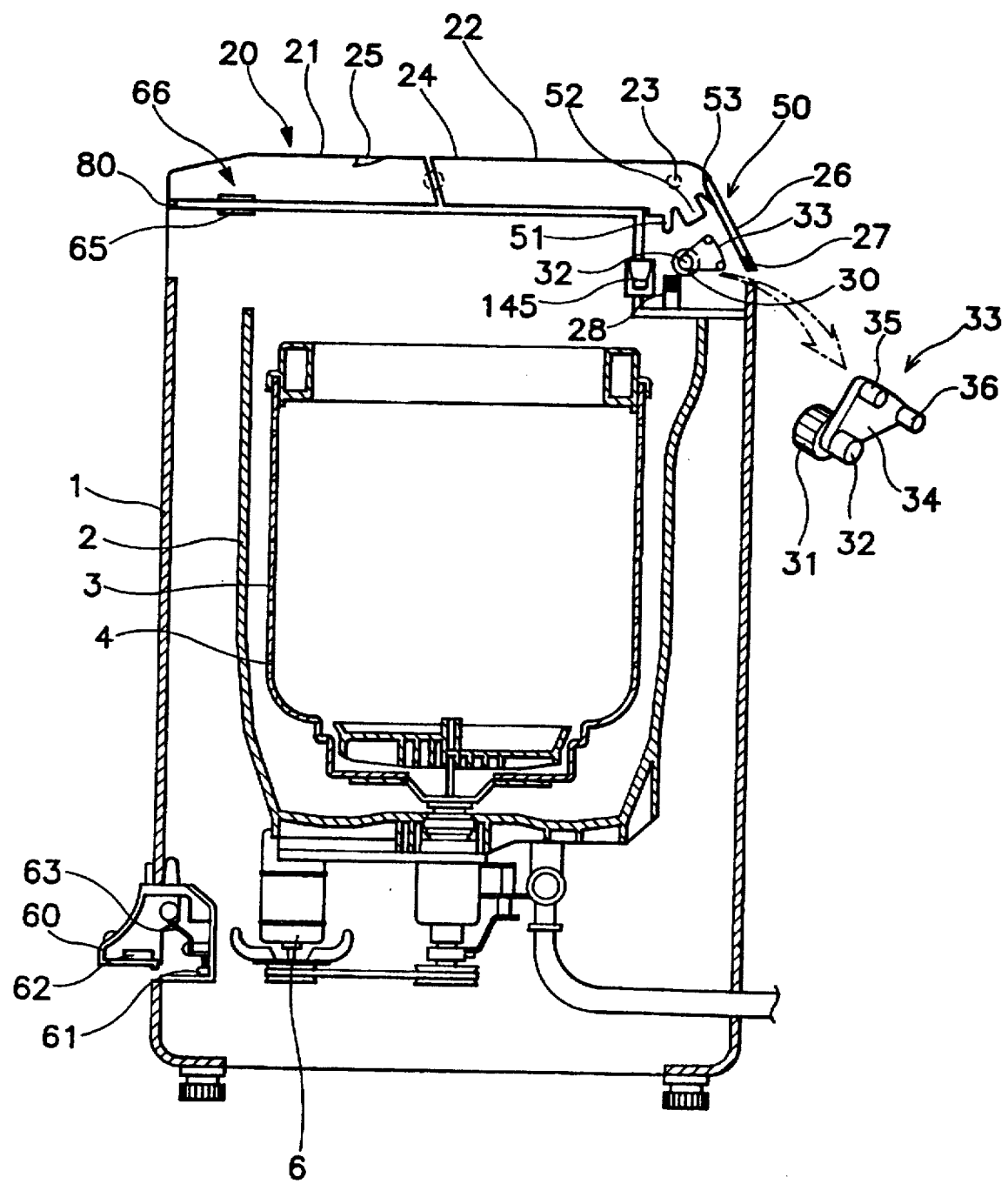

FIG. 1 schematically shows a washing machine with an automatic door opening/closing apparatus in accordance with the present invention.

The washing machine with the automatic door opening/closing apparatus includes: a cylindrically-shaped water tub 2 inside of a main body 1; a laundry tub 3 which is rotatably mounted in the water tub 2 which tub has a plurality of holes 4 that allow water to be in continual communication with the water tub 2; and a door 20 disposed on the top of the main body 1 that opens and closes the entrance to the water and laundry tubs 2 and 3.

The door 20 is divided into a front half member 21 and a rear half member 22, which cover the front and rear of the top of the main body 1, respectively. The door 20 is arranged to open on a first hinge 23 at the rear end of the main body 1. The rear end of the front half member 21 of the door 20 is joined to the front end of the rear half member 22 by a second hinge 24.

When the door 20 is opened, the front half member 21, rotates about the second hinge 24, and is folded back upon the underside of the rear half member 22; and the rear end of the rear half member 22 rotates about the first hinge 23. Located close to the first hinge 23, there is a driving/rotating means 30 that rotates the door 20 in forward or reverse directions. The driving/rotating means 30 includes a door motor 31, which applies force to the door 20 for its opening/closing action, and a rotary member 33, which is joined to a rotating shaft 32 of the door motor 31. The rotary member 33 consists of a rotary plate 34 formed in a wedge shape, and first and second bosses 35 and 36 that protrude circumferentially on the front of the rotary plate 34.

Close to the first hinge 23 on the rear half member 22, there is a cam member 50, which includes first, second and third teeth 51, 52 and 53. As the rotary member 33 turns with a forward or reverse rotation of the door motor 31 (the movement for opening the door is defined as a forward rotation), the first and second bosses 35 and 36 come to properly engage with the teeth 51, 52 and 53, transferring rotational force thereto.

On a predetermined spot of the rear section of the main body 1, there is an open sensor, preferably embodied as a waterproofed fixedly-mounted reed switch 28, that senses the opened state of the door 20. A permanent magnet 27 is fixed on a lever 26 extending from the rear half member 22. When the automatic door opening/closing apparatus has completely opened the door 20, the magnetic force of the permanent magnet 27 closes the contacts of the reed switch 28.

On a predetermined spot of the front section of the main body 1, there is an open sensor, preferably embodied as a fixedly-mounted waterproofed reed switch 65, that monitors a closed state of the door 20. A permanent magnet 66 is fixed on the front half member 21 in a position opposite the reed switch 65. When the automatic door opening/closing apparatus has completely closed the door 20, the magnetic force of the permanent magnet 66 closes the contacts of the reed switch 65.

In a predetermined location on the front-lower section of the main body 1, there is a foot switch, preferably embodied as a waterproofed reed switch 61, that generates a command to open or close the door 20. The contacts of the reed switch 61 can be closed by the magnetic force of a permanent magnet 62 provided to a pedal 60 which is held open by a leaf spring 63. In other words, as the pedal 60 is depressed the permanent magnet 62 approaches the reed switch 61 to thereby close the contacts of the reed switch 61.

Additional reference numerals denote the following elements: a handle 25 used to open or close the door 20 manually, a roller 80 used to help the smooth opening/closing action of the door 20, and a wash motor 6.

Various modifications and variations could be made in the location and structure of the open sensor, the closed sensor and the reed switches associated with issuing the open/close command without limitation to the above-described embodiment. For instance, the reed switch 61 may be disposed in a location on the upper section of the washing machine whereby it can be easily operated by hand. In this case, the reed switch 61 could be placed on a control panel (not illustrated) formed on the front top portion of the main body 1 along with other control keys.

According to the preferred embodiment of the present invention, the open sensor 28, the closed sensor 65 and the open/close sensor 61 are realized as waterproof reed switches; their use takes into account the inevitable moisture associated with a washing machine's normal operating situation. However, other mechanically-operated or photoelectric switches could also be used.

FIGS. 2A, 2B, 2C, 2D, and 2E are enlarged views depicting sequential automatic door opening/closing action of the washing machine.

As shown in FIG. 2A, when the door 20 is completely closed, the first and second bosses 35 and 36 are not within the rotating radius of the first, second and third teeth 51, 52 and 53 so as to allow the manual opening and closing of the door. At this point, if the pedal 60 is depressed, whereby a command to open the door 20 is issued, the rotary plate 34 rotates forward and the first boss 35 comes to engage the first tooth 51, as depicted in FIG. 2B. Under this condition, if the door motor 31 continues its forward rotation, the rear half member 22 is rotated open, and the second boss 36 engages the second tooth 52, as illustrated in FIGS. 2C and 2D. After the second tooth 52 turns to thereby open the door 20 completely, the second boss 36 disengages from the second tooth 52. Approximately at this time, the door motor 31 stops operation but the rotary plate 34 continues to turn for a predetermined period of time by the inertial force of the door motor 31. As depicted in FIG. 2E, when the door 20 of the washing machine is completely opened, the user is able to manually close the door 20.

In order to close the door 20 automatically, the automatic door opening/closing apparatus of the present invention proceeds through the aforementioned steps in the opposite direction. More specifically, if the pedal 60 is depresses, the door motor 31 rotates the rotary plate 34 in reverse and the second boss 36 comes to engage the third tooth 53, as shown in FIG. 2D. As the door motor 31 gradually lowers the rear half member 22 of the door 20, the first boss 35 rotates to engage the second tooth 52, as shown in FIGS. 2C and 2B. When the second tooth 52 has rotated to fully close the door 20, the first boss 35 disengages from the second tooth 52. Approximately at this time, the door motor 31 stops operation, but the rotary plate 34 continues to rotate for a predetermined period of time by inertial force of the door motor 31, as shown in FIG. 2A. In conclusion, all of the mechanical components return to the state of FIG. 2A.

Figure 3:
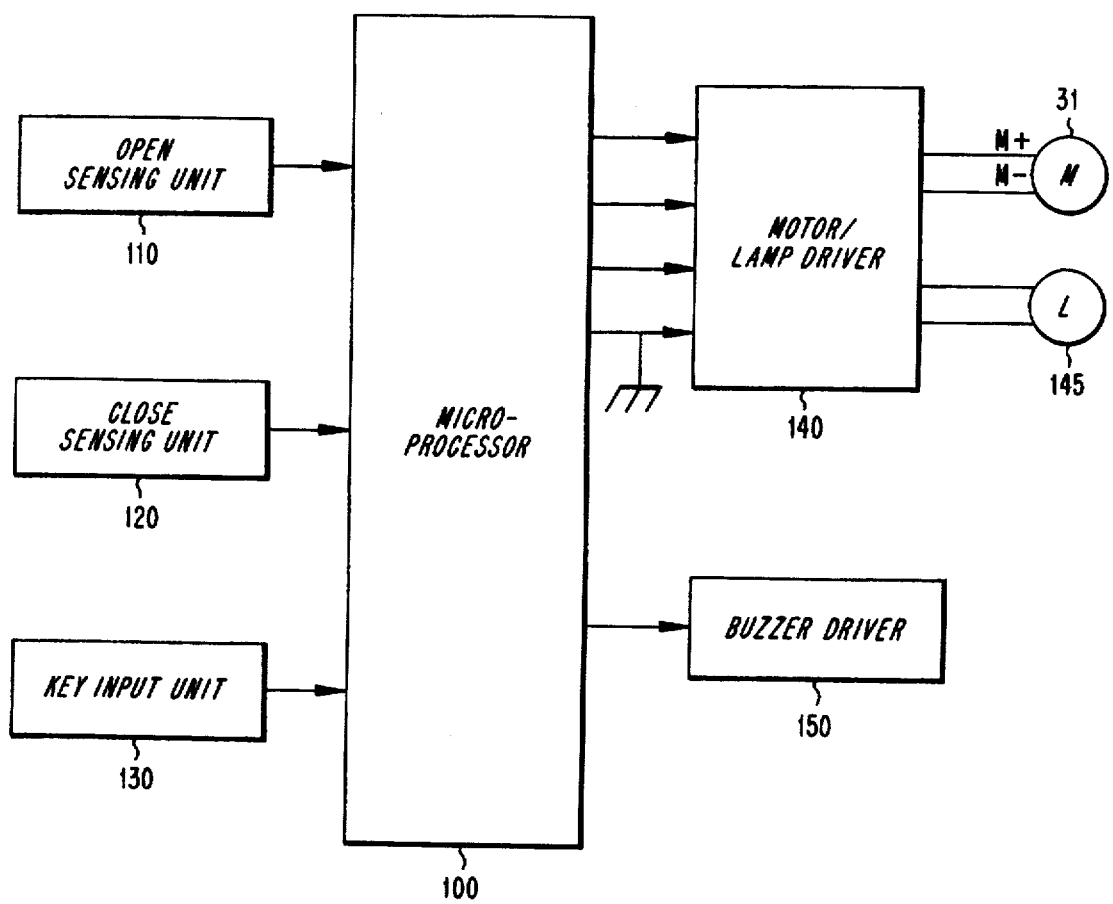

FIG. 3 is a block diagram of the automatic door opening/closing apparatus for a washing machine in accordance with the present invention.

The circuitry of the apparatus is realized as a key input unit 130 through which a command to open or close the door 20 is sent, an open-sensing unit 110 used to sense the door being opened, a closed-sensing unit 120 used to sense the door being closed, a door motor 31 which supplies power for opening and closing the door 20, and a lamp 145 which illuminates the interior of the laundry tub 3. The apparatus also includes a motor/lamp driver 140 which energizes the door motor 31 and the lamp 145, a buzzer driver 150 which operates a buzzer that audibly announces information on the current operating state of the door 20 by producing a buzzing sound, and a microprocessor 100 which controls the operation of the door 20 by analyzing information supplied from the open-sensing unit 110 and the close-sensing unit 120. The open-sensing unit 110 and the closed-sensing unit 120 comprise the reed switches 28 and 65, respectively. The door motor 31 is a direct-current motor whose rotational frequency is reduced at a predetermined ratio by a gear box.

The following description concerns an inventive method of controlling the automatic door opening/closing apparatus for a washing machine.

FIG. 4 is a flow chart describing the method of controlling the automatic door opening/closing apparatus of the present invention. Control is described with respect to the microprocessor 100.

As shown in FIG. 4, once power is applied to the washing machine, the microprocessor 100 carries out program initialization (S10) so that a number of variable error is set to "0". Subsequently, the microprocessor 100 determines (S12) if the number of errors exceeds a number N (in this embodiment N=3). If the microprocessor 100 determines (S12) that the number of errors is less than 3, it proceeds to step S14 where it determines if a command to open or close the door 20 has been received.

If a command to open the door 20 is not detected, it returns to the main routine. This loop constitutes a standby mode of the system. If a command to open or close the door 20 is detected, it instructs (S16) the door opening/closing system to perform an opening operation or closing operation according to the current state of the door 20. More specifically, if the door 20 is open, the microprocessor 100 operates the door motor 31 in reverse so as to close the door 20; if the door 20 is close, it operates the door motor 31 forwards to open the door 20.

Next, the microprocessor 100 determines (S18) if there is a fault in the door opening/closing action by assessing if the door 20 is not in a condition to open or close in a normal manner. Examples producing this state are: heavy things placed on the door 20 or garments dropped over the entrance to the laundry tub.

The microprocessor 100 bases its assessment on whether or not an inversion has occurred in the open/closed state of the door 20 for a prescribed period of time after the start of the door motor 31's forward or reverse rotation, as supplied by the open and closed-sensing units 110 and 120. The microprocessor 100 interprets (S18) such an inversion as the normal operating state of the opening/closing system and the absence thereof as an error in operation. If an error is not detected, the number of errors is cleared simultaneously with stopping (S32) the operation of the door motor 31. The microprocessor 100 then returns to the main routine, entering the system into standby mode.

If an error is detected, the microprocessor 100 moves to step S20 where it increases the number of errors by one, and then to step S22, where it operates the door motor 31 to return the door 20 to the position it was in when the door opening/closing command was given. The microprocessor 100 also interprets (at S18) as an error in the operation the door 20 not moving even though the door motor 31 is operating.

During the repetition of the above process, if the microprocessor 100 determines (at S12) that the number of errors has exceeded N, it goes to step S24 to determine if the door 20 was opened or closed manually. The microprocessor 100 does this by determining the presence of a state inversion in the output signal of the open sensor 28 or closed sensor 65 while the door motor 31 is not operating.

If the door 20 has been closed manually, the micropressor 100 executes step S26, which clears the number of errors, and then returns to standby mode. If the door 20 has not been opened or closed manually (S24), it determines (at S28) the presence of a command to open or close the door 20, and then returns to standby mode by way of either step S30 where it ignores the door opening/closing command, or directly if a door opening/closing command is not present. In other words, even if a user sends an opening/closing command by using the reed switch 61, the microprocessor 100 ignores it and does not permit the door motor 31 to operate.

As described above, in the case where something hinders the normal operation of the automatic door opening/closing apparatus, the present invention stops the automatic door opening/closing apparatus, thereby preventing probable damage to the related components of the washing machine owing to the forced action of the apparatus.

What is claimed is:

1. A method of controlling an automatic door opening/closing apparatus for a washing machine door, the method comprising the steps of:

determining whether or not there is an error in an automatic door opening or closing operation which operation is carried out in response to a command to open or close the washing machine door;

determining if the erroneous operation is repeated more than a predetermined number of times according to consecutive incoming commands to open or close the washing machine door; and in the event that the erroneous operation is repeated more than the predetermined number of times, ignoring a subsequent command to open or close the washing machine door.

2. A method as set forth in claim 1, further comprising the step of:

returning the door to the washing machine to an original position in the event that the error occurs.

3. A method as set forth in claim 1, wherein the step of determining if there is an error in an automatic door opening or closing operation is performed on the basis of whether or not an inversion occurs in an open/closed state of the door within a prescribed period of time after an automatic door opening or closing operation is initiated.

4. A method as set forth in claim 1, further comprising the step of:

clearing the number of errors in the case where the door of the washing machine has been opened or closed manually at the time of occurrence of the errors.

5. A method as set forth in claim 1, wherein said predetermined number is 3.

6. A method for controlling the operation of an automatic door mechanism in a washing machine, said method comprising the steps of:

sensing a command to automatically open or close a washing machine door;

sensing whether a failure occurs in opening or closing the door in response to the command to automatically open or close the door;

incrementing a counter indicating the failure;

determining whether the counter is equal to a predetermined number; and failing to engage the automatic door mechanism in response to a subsequent a command to automatically open or close the door if the counter exceeds the predetermined number.

7. The method claimed in claim 6, further comprising the step of:

returning the door to an original position if a failure is detected.

8. The method claimed in claim 6, wherein failure is indicated by a lack of a transition between a door open state and a door closed state within a predetermined time period following entry of the command to automatically open or close the door.

9. The method claimed in claim 6, further comprising the step of:

clearing the counter if the door is opened or closed manually following a failure indication.

* * * * *